United States Patent Office 2,784,372
Patented Mar. 5, 1957

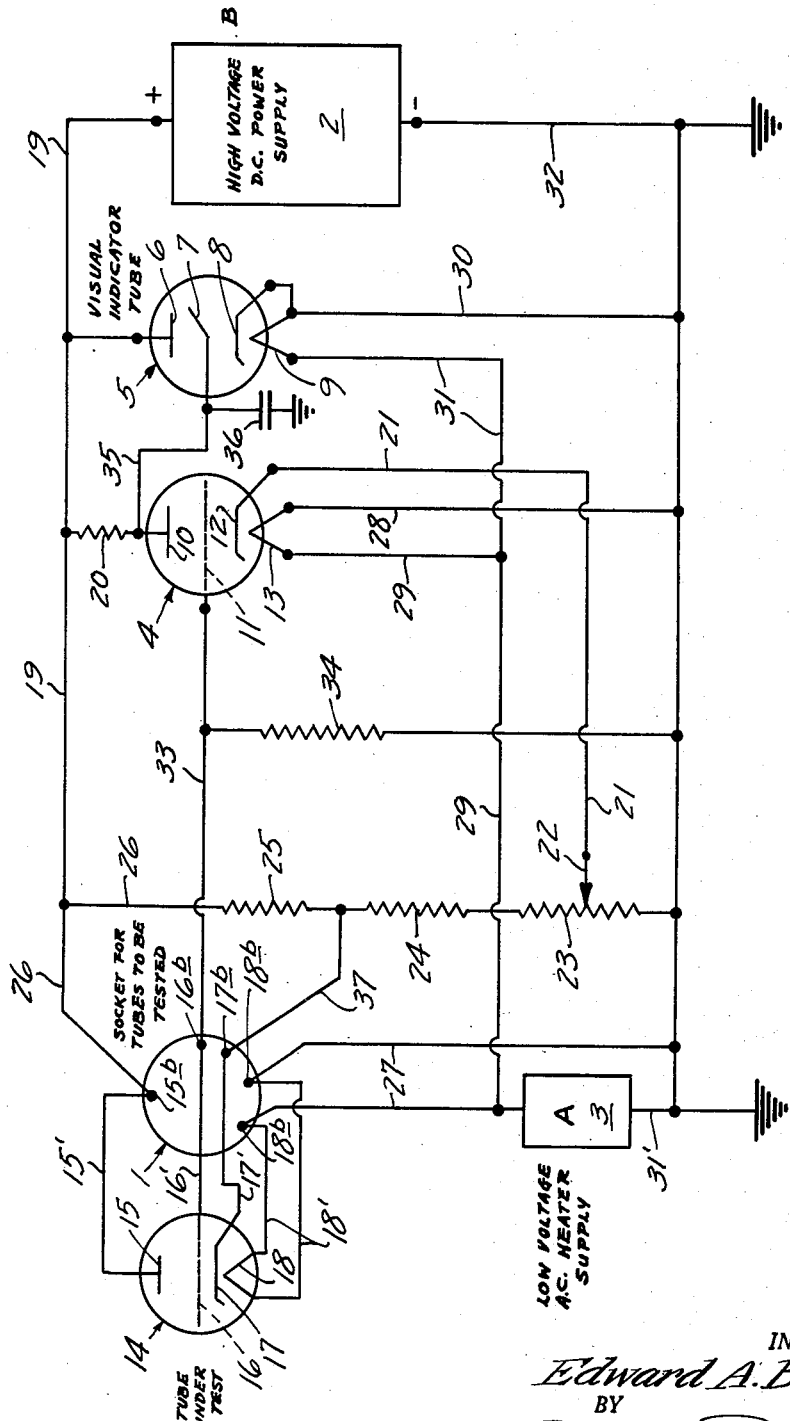

2,784,372

APPARATUS AND METHOD FOR TESTING ELECTRONIC VACUUM TUBE AMPLIFIERS

Edward A. Bramsen, Minneapolis, Minn.

Application February 18, 1955, Serial No. 489,021

4 Claims. (Cl. 324—23)

Generally stated, the instant invention relates to improvements in methods and apparatus for testing electronic vacuum tube amplifiers of the kind generally employed in television and radio apparatus. In a more specific sense, however, the invention pertains to improved methods and apparatus for simultaneously testing such vacuum tube amplifiers for a plurality of potentially faulty conditions, all from a single setting of the apparatus, thereby reducing to a minimum the time, labor and skill required to test a tube for faults due to a plurality of potential causes.

The invention pertains particularly to improved apparatus and methods and means for testing vacuum tube amplifiers for a plurality of potentially faulty conditions resulting in faulty grid performance, particularly in circuits where the grid resistance is of high value.

In its prefered embodiment, as disclosed in the drawings hereof, testing apparatus, built in accordance with the invention, will simultaneously test a given vacuum tube amplifier for the following noted potentially faulty conditions, all resulting in unsatisfactory grid performance:

1. Grid to cathode leakage;
2. Internal gaseous condition;
3. Grid emission; and
4. Cathode to heater leakage.

Cathode to heater leakage (test 4 above), while not directly involving the grid of the tube under test, does, nevertheless, most frequently result in bad grid circuit performance, due primarily to the fact that the heaters of such tubes are usually A. C. operated and reflect hum to the grid when leakage occurs between cathode and heater. Hence, cathode to heater leakage generally shows up in the grid circuit.

By means of the preferred embodiment illustrated, tubes are tested simultaneously for all four of the conditions above listed, as a result of a single setting of the apparatus, and the existence of any one or more of the said test conditions are directly indicated by a common indicator. This indicator is not discriminatory insofar as isolating the particular fault is concerned, but such is not important to the serviceman, for example, who is not in any event capable of repairing the tube and must essentially replace the same to restore satisfactory performance, in the event of any one or more conditions subject to test.

The apparatus of the invention is primarily useful as a serviceman's aid or tool as a means for quickly detecting conditions resulting in unsatisfactory grid performance. It should be understood that apparatus of the invention does not test tubes for cathode emission and should, therefore, be used as a supplement to other testing equipment or techniques.

Other objectives of the invention are the provisions of highly efficient, easily used, compact and low-cost instrumentality for testing vacuum tube amplifiers simultaneously for a plurality of troublesome conditions.

The above and other important objectives and advantages of the invention will be made apparent from the following specification, claims and appended drawings.

Referring to the drawing:

The single view is a wiring diagram of a preferred embodiment of the invention.

Referring to the drawing, the numeral 1 indicates a conventional socket for receiving and having contacts for engagement with the element contacts of tubes to be tested. In commercial forms, the apparatus will involve a plurality of such sockets each for use with different types of tubes having sufficiently similar characteristics, but the use of one such socket is all that is considered necessary for describing the invention. Referring further to the drawing, the numeral 2 indicates by box diagram a conventional high voltage D. C. power supply or B power supply, which may be in the form of a conventional B battery or batteries, but would more usually take the form of a conventional A. C. operated power supply. A low voltage tube heater supply is indicated by box diagram 3 and, while this may be either A. C. or D. C., it will usually be of the A. C. variety, such as provided by the low voltage secondary of a transformer. Also forming part of the testing apparatus is a D. C. amplifier tube 4 and a suitable indicator 5.

Preferably, and in the preferred embodiment of the invention illustrated, this indicator 5 takes the form of a visual indicator tube, such for example as a commercially-available 6AF6G. Visual indicators of this kind are generally referred to as "tuning eyes" and give a direct reading indication in the nature of a V-shaped slit appearing on the end of the tube, and which is substantially closed when the deflection control element is at the same potential as the plate thereof, but which slit opens to varying degrees when the voltage applied to the deflection control element is reduced with respect to plate voltage. The plate of the visual indicator tube 5 is indicated by 6, the deflection control element thereof by 7, the cathode thereof by 8 and the heater thereof by 9. The D. C. amplifier tube 4 is shown as a triode and, for the purpose of the present example, may be a commercially available 6J5 or its equivalent. The plate of this tube is indicated by 10, the grid thereof by 11, the cathode thereof by 12, and the heater by 13. In the arrangement illustrated, the visual indicator tube 5 is driven by the D. C. amplifier tube 4. In practice, functions of these tubes 4 and 5 may be obtained in a single dual purpose tube, such as a 6E5, 6U5, or 6G5, without departing from the spirit of the instant invention. While it has been found that visual indicator tubes of the character mentioned are generally most advantageous, it should nevertheless be appreciated that other types of indicators, such as a conventional volt meter, may be substituted therefor.

In the drawing, a tube to be tested is indicated by 14 and, for the purpose of the present example, this is shown as a triode comprising plate 15, grid 16, cathode 17, and heater 18, and may be a commercially available 6AB4. This tube 14 has the usual projecting contact prongs 15', 16', 17' and 18' leading respectively from its elements 15, 16, 17 and 18, and which are represented in the drawing hereof by lead lines leading respectively to corresponding receiving contacts 15B, 16B, 17B and 18B of the socket 1.

The plate circuit for the D. C. amplifier tube 4 comprises a lead 19 from the positive side of the high voltage D. C. supply 2, a resistor 20, the plate 10 and cathode 12 of tube 4, a lead 21 from cathode 12 to the movable contact arm 22 of a potentiometer, which latter further comprises a fixed resistance element 23 forming the negative section of a multi-section voltage divider, further comprising resistance sections 24 and 25, and ground to the negative side of the D. C. source 2. In practice, the movable contact arm 22 of the potentiometer will be provided with a control knob or the like within convenient reach of the operator.

The positive end of the voltage divider comprising sections 23 through 25 is connected to the positive side of the D. C. source 2 through the lead 19 and a lead 26 which also extends to the plate contact 15B of the socket 1.

The heater 18 of a tube 14 to be tested is energized through a heater circuit comprising leads 27 and the low voltage heater supply 3, and which circuit is connected to the negative side of the high voltage D. C. source 2 through ground. The heater 13 of the D. C. amplifier tube 4 is energized through a suitable heater circuit comprising the source 3 and leads 28 and 29 and ground. The circuit of the heater 9 of the indicator tube 6 comprises ground lead 30, a lead 31, part of lead 29 and ground. It will be noted that one side of the low voltage supply 3 is connected to ground by lead 31' and that the negative side of the high voltage D. C. supply 2 is connected to ground through a lead 32.

The grid 16 of the tube 14 under test is connected to the grid 11 of the D. C. amplifier tube 4 by a lead 33, and said grids 16 and 11 are connected to ground through a grid return resistor 34.

The cathode 8 of the visual indicator tube 5 is connected to one side of the heater 9 and to ground through heater lead 30. The deflection control element 7 of this tube is, on the other hand, connected to the plate 10 of the amplifier tube 4, so that it will be responsive to the voltage drop across the resistor 20 when plate current flows in the tube 4, by a lead 35. In the interest of stabilization of the deflection indication by the visual indicator tube 5, there is preferably provided a small value condenser 36 connected from the lead 35 to ground and the negative side of the D. C. source 2.

As an aid to those desiring to practice the invention, the following specifications are given as suitable for use in connection with the tubes given as examples:

D. C. potential available at high voltage supply 2 and applied to target 6 of tube 5, plate 10 of tube 4 and plate 15 of tube 14—approximately 150 volts positive.
Positive potential at cathode 17 of tube 14—approximately 45 volts positive or sufficient to produce plate current cut-off in tubes to be tested.
Normal current flowing in section 23 of voltage divider 23—24—25—approximately 12 ma.
Resistor 25—10,000 ohms.
Resistor 24—3,900 ohms.
Resistor 23—1,000 ohms.
Grid return resistor 34—approximately 10 megohms.
Plate resistor 20—300,000 ohms.

Operation

As a preliminary to testing of a tube 14 and before placing the same in the socket 1, the positive potential on the cathode 12 of the D. C. amplifier tube 4 is adjusted to produce plate current cut-off in tube 4 by manipulation of the movable contact arm 22 of the potentiometer section of the voltage divider 23—24—25; this condition being indicated by closure of the segmental slit appearing on the end of the indicator tube 5. With this accomplished, a tube 14 to be tested is inserted in the socket 1, preferably after preheating in the apparatus in which it normally functions. However, if the tube 14 is placed in the socket 1 in a cold condition, it should be permitted to heat up to normal temperature before taking a reading. If the tube 14 under test is in satisfactory condition with respect to the four tests simultaneously conducted, namely, grid to cathode leakage, gaseous condition, grid emission, and cathode to heater leakage, no current will flow between the elements of the tube 14 under test to upset the balanced zero plate current flow condition in the D. C. amplifier tube 4 and the visual indicating slit on the end of the indicator tube 6 will remain in its closed or substantially closed condition to indicate this satisfactory condition. However, if any one or more of the potential faults subject to test are prevalent in tube 14, namely, grid to cathode leakage, gaseous condition, grid emission, or cathode to heater leakage, this balanced or plate current cut-off condition in the D. C. amplifier tube 4 will be upset by current flow between some of the elements of the tube under test causing current to flow in the plate circuit of the D. C. amplifier tube 4 through the plate resistor 20, causing a voltage drop across said resistor 20 and at the deflection control element 8 of tube 5, producing a deflection indication in indicator tube 6 visible as an opening of the slit appearing at the end of the tube, of varying proportions, depending upon the degree of the error. If the magnitude of this deflection indication is beyond a predetermined value, the tube 14 under test is rejected, at least insofar as use in circuits having high values of grid circuit resistance is concerned. In practice, however, it is found that some tubes which are rejected by this test procedure as unsatisfactory for operation in circuits having high values of grid return resistance may give satisfactory operation in other circuits, even in the same apparatus, wherein much lower values of grid return resistance are employed.

As previously stated, the apparatus described does not test tubes for cathode emission, which is a condition which can readily be determined by conventional testing equipment and techniques and, in fact, should be determined before subjecting the tube to test in the apparatus and in the manner described. Furthermore, it should be understood that the apparatus and method of the invention will not indicate open circuit conditions of a tube under test, for the reason that no current flows between the elements of the tube under test when the tube under test is in a satisfactory condition. In other words, if the tube under test is normal, we have an open circuit condition between all elements of the tube, and it is precisely this condition which produces an indication of acceptability on the indicator tube 6.

The following detailed description of operation is given as a supplement to the generalized statement of operation given above. In the specific circuit and with the specific circuit values and tube identifications given or equivalents of the latter, the potentiometer comprising arm 22 and fixed resistance section 23 of the voltage divider 23, 24, 25 will be adjusted, as a preliminary to insertion of a tube 14 to be tested into the socket 1, to produce plate current cut-off (zero plate current) in the D. C. amplifier tube 4. Normally, with the values given, there will be approximately 12 ma. current flowing through the potentiometer section 23 of the voltage divider and the potentiometer is adjusted to plate current cut-off for amplifier tube 5 with normal current flow through the resistor 23 of the potentiometer. Furthermore, it should be understood that the cathode contact 17B of the socket 1 for tubes to be tested is connected to an intermediate point on the voltage divider 23—24—25, whereat the voltage available under such normal current flow through the voltage divider will balance the plate circuit of the tube to be tested to plate current cut-off (zero plate current). In the absence of plate current flow in the D. C. amplifier tube 4 the deflection control element 7 of the indicator tube 5 will be at the same potential as the plate 6 of the indicator tube and said tube will indicate such condition by a closed slit. Of course, if the tube 14 to be tested is in satisfactory condition with respect to grid to cathode leakage, gaseous condition, grid emission and cathode to heater leakage, then this condition and indication will prevail after insertion of a tube to be tested into the socket 1. However, if this tube 14 under test is faulty with respect to grid to cathode leakage or internal gaseous condition (conductive gases within the tube), current will flow from cathode 17 to grid 16 of such tube through the common grid return resistor 34 producing a voltage across said resistor, the positive component of which will be impressed on the grid 11 of the D. C. amplifier tube 4 to bring about plate current flow in the D. C. amplifier 4, which will produce a voltage drop across the series plate resistor 20 to actuate the indicator. If, on the other hand, the tube under test, is faulty with respect to cathode to heater leakage, current will flow through a bypass or shunt circuit from the intermediate portion of voltage divider 23—24—25 comprising a lead 37 to the cathode contact 17B of socket 1, cathode contact 17' of tube 14, cathode 17 and heater 18 of tube 14 and the grounded heater contact 18'. The current thus flowing in this shunt circuit being diverted around voltage divider sections 23 and 24 and will reduce the current flow through and voltage drop across the potentiometer section 23 of the voltage divider to reduce the positive bias on the cathode 12 of tube 4 below plate current cut-off value, which will allow plate current to flow in tube 4 through plate resistor 20 to produce a voltage necessary to actuate the deflection indicator tube 6 to indicate this faulty condition. Still further, if the tube under test is faulty with respect to grid emission, a circuit will be closed comprising the high potential source 2, the plate and grid elements 15 and 16 respectively of the tube 14 under test, and the common grid return resistor 34 to produce a voltage across the latter, which will swing the grid of the D. C. amplifier tube 4 positive to produce plate current flow in said tube and the voltage necessary to actuate the indicator 5.

My invention has been thoroughly tested and found to be completely satisfactory for the accomplishment of the objectives set forth; and, while I have shown and described a commercial embodiment of my novel device, it will be understood that the same is capable of considerable modification and that modification may be made without departure from the spirit and scope of the invention as defined in the claims.

What I claim is:

1. Apparatus for testing electronic amplifier tubes for defects including grid to cathode leakage, internal gaseous condition, grid emission and cathode to heater leakage; said apparatus comprising a socket for receiving heater, cathode, grid and plate contacts of a tube to be tested; a D. C. electronic amplifier tube having plate and cathode and grid and heater elements, a high voltage D. C. source, a heater circuit for the D. C. amplifier tube, a heater circuit for the tube to be tested comprising the heater contacts of said socket and which circuit is conductively connected to the negative side of the high voltage D. C. source, a multiple section voltage divider connected across the high potential D. C. source, a relatively negative section of the voltage divider comprising the fixed value resistance element of a potentiometer, a plate circuit for the D. C. amplifier tube comprising an electrical connection from the positive side of the D. C. source to the plate of said tube and a conductor from the cathode of said tube to the movable contact of the potentiometer, a plate circuit for tubes to be tested comprising an electrical connection from the positive side of the high voltage D. C. source to the plate contact of said socket and an electrical connection from the cathode contact of said socket to an intermediate point on the voltage divider on the positive side of the potentiometer and whereat there is sufficient positive potential to produce plate current cut-off of tubes to be tested, conductor means connecting a grid contact of said socket and a grid of the D. C. amplifier tube together and to the negative side of the high voltage D. C. source through a common grid return resistor, and a voltage indicator connected to indicate current flow in the plate circuit of the D. C. amplifier tube, the plate current in the D. C. amplifier tube being adjustable to cut-off by regulation of the potentiometer in the absence of current flow between the elements of a tube to be tested as a preliminary to testing of a particular tube, grid to cathode leakage and internal gaseous condition of a tube under test causing current to flow from cathode to grid of such tube through the common grid return resistor producing a voltage across said resisor the positive component of which will be impressed on the grid of the D. C. amplifier tube to bring about plate current flow in said tube to actuate the indicator, cathode to heater leakage in the tube under test causing part of the current flowing through the voltage divider to shunt around the potentiometer section of the latter and thereby reduce the positive bias of the cathode of the D. C. amplifier tube to produce plate current flow in said tube and a resultant actuation of the indicator, grid emission of the tube under test closing a circuit comprising said high potential source and plate and grid elements of the tube under test and the common grid return resistor to produce a voltage across the latter which will swing the grid of the D. C. amplifier positive to produce plate current flow in said tube to actuate the indicator.

2. The structure defined in claim 1 wherein there is a resistor connected in the plate circuit of the D. C. amplifier and wherein the indicator is voltage responsive and is connected across the last said resistor for response to the voltage drop through the resistor resulting from plate current flow in the plate circuit of the D. C. amplifier tube.

3. Apparatus for testing electronic amplifier tubes for defects including grid to cathode leakage, internal gaseous condition and cathode to heater leakage; said apparatus comprising a socket for receiving and having contacts for engagement with the grid, cathode and heater contacts of a tube to be tested; a D. C. electronic amplifier tube having plate and cathode and grid and heater elements, a high voltage D. C. source, a heater circuit for the D. C. amplifier tube, a heater circuit for a tube to be tested comprising the heater contacts of said socket and which circuit is conductively connected to the negative side of the high voltage D. C. source, a multiple section voltage divider connected across the high potential D. C. source, a relatively negative section of the voltage divider comprising the fixed value resistance element of a potentiometer, a plate circuit for the D. C. amplifier tube comprising an electrical connection from the positive side of the D. C. source to the plate of said tube and a conductor from the cathode of said tube to the movable contact of the potentiometer, an electrical connection from the cathode contact of said socket to an intermediate point on the voltage divider on the positive side of the potentiometer, conductor means connecting the grid contact of said socket and a grid of the D. C. amplifier tube together and to the negative side of the high potential D. C. source through a common grid return resistor, and a voltage indicator connected to indicate current flow in the plate circuit of the D. C. amplifier tube, the plate current in the D. C. amplifier tube being adjustable to cut-off by regulation of the potentiometer in the absence of current flow between the elements of the tube to be tested as a preliminary to testing of a particular tube, grid to cathode leakage and internal gaseous condition of a tube under test causing current to flow from cathode to grid of such tube through the common grid return resistor producing a voltage across said resistor the positive component of it which will be impressed upon the grid of the D. C. amplifier tube to bring about plate current flow in said tube to actuate the indicator, cathode to heater leakage in the tube under test causing part of the current flowing through the voltage divider to shunt around the potentiometer section of the latter and thereby reducing the positive bias on the cathode of the D. C. amplifier tube to produce plate current flow in said tube and resultant actuation of the indicator.

4. Apparatus for testing electronic amplifier tubes for defects including grid to cathode leakage, internal gaseous condition and grid emission; said apparatus comprising a socket for receiving and having contacts for engagement with the grid, cathode and heater contacts of a tube to be tested; a D. C. amplifier tube having plate and cathode and grid and heater elements, a high voltage D. C. source, a heater circuit for the D. C. amplifier tube, a heater circuit for the tube to be tested comprising the heater contacts of said socket and which circuit is conductively connected to the negative side of the high potential D. C. source, a plate circuit for the D. C. amplifier tube comprising said high potential source and a manually adjustable source of bias potential interposed between the cathode of said tube and the negative side of the high potential D. C. source with its positive side facing the cathode and of sufficient maximum potential to bias said tube to plate current cut-off; a plate circuit for tubes to be tested comprising the plate and cathode contacts of said socket, said high potential D. C. source, and a source of bias potential interposed between the cathode contact of said socket and the negative side of the high potential source of sufficient value to bias tubes of the kind to be tested to plate current cut-off; conductor means connecting a grid contact of said socket and a grid contact of the D. C. amplifier tube together and to the negative side of the high potential D. C. source through a common grid return resistor, and a voltage indicator connected to indicate current flow in the plate circuit of the D. C. amplifier tube, the plate current in the D. C. amplifier tube being adjustable to cut-off by regulation of the adjustable grid bias potential source for the D. C. amplifier tube in the absence of current flow between the elements of a tube to be tested as a preliminary to testing of a given tube, grid to cathode leakage and internal gaseous condition of a tube under test causing current to flow from cathode to grid of such tube through the common grid return resistor producing a voltage across said resistor the positive component of which will be impressed upon the grid of the D. C. amplifier tube to bring about plate current flow in said tube to actuate the indicator, grid emission of the tube under test closing a circuit comprising said high potential source and the plate and grid elements of the tube under test and the common grid return resistor to produce a voltage across the latter which will swing the grid of the D. C. amplifier positive to produce plate current flow in said tube to actuate the indicator.

References Cited in the file of this patent
UNITED STATES PATENTS

| | | |
|---|---|---|
| 2,235,173 | Shepard | Mar. 18, 1941 |
| 2,619,619 | Trevor | Nov. 25, 1952 |
| 2,699,528 | Periale | Jan. 11, 1955 |